United States Patent [19]

Brungs et al.

[11] 3,869,270

[45] Mar. 4, 1975

[54] GLASS COLOUR CHANGES

[75] Inventors: Michael Brungs, Concord, New South Wales; John Burniston, Highgate, both of Australia

[73] Assignee: A.C.I. Operations Pty. Limited, Melbourne, Victoria, Australia

[22] Filed: Aug. 7, 1973

[21] Appl. No.: 386,446

[52] U.S. Cl. ................................................. 65/134
[51] Int. Cl. ............................................. C03b 5/16
[58] Field of Search ..................................... 65/134

[56] References Cited
UNITED STATES PATENTS

| | | | |
|---|---|---|---|
| 3,003,886 | 10/1961 | Pither | 65/134 X |
| 3,150,991 | 9/1964 | Monks, Jr. | 65/134 X |
| 3,350,185 | 10/1967 | Rough | 65/134 X |
| 3,558,297 | 1/1971 | Carney et al. | 65/134 |
| 3,779,733 | 12/1973 | Janakirama-Rao | 65/134 X |

Primary Examiner—S. Leon Bashore
Assistant Examiner—Frank W. Miga
Attorney, Agent, or Firm—Harold L. Stowell

[57] ABSTRACT

Foam formation is reduced in a glass furnace during changeover from a first to a second glass melt of different oxidation state and colour comprising adjusting, in a series of steps, the oxidation state of the first melt towards that of the second melt prior to introducing or removing colourants.

4 Claims, No Drawings

GLASS COLOUR CHANGES

The present invention relates to methods for changing the colour of glass melt in a glass furnace.

Often, the particular colour of a glass melt is associated with a particular range of oxidation state in the melt that is compatible with that colour. Hence, to change the colour of the melt it is also necessary to change its oxidation state.

However, foam formation occurs when glass melts of different oxidation state are mixed, and since the foam reduces heat transfer in the melt and causes gas inclusions known as seed and blister to appear in the final manufactured glass, it is necessary to effect such colour changes in such a way as to minimise foam formation.

Hitherto, such colour changes have therefore been effected using a run-out/flush/fill-on technique. As the name suggests, this procedure involves running out or draining most of the molten glass from the furnace, and displacing or "flushing" the remaining glass in the furnace with glass of incoming colour. The furnace is then filled with batch and cullet appropriate to the new colour. In this way foam formation is minimised, though the technique is a very lengthy one, often taking between 80 and 96 hours to complete.

It is thought that foam formation results from the reaction of sulphide glass according to the following reactions:

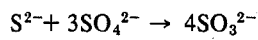

$$S^{2-} + 3SO_4^{2-} \rightarrow 4SO_3^{2-}$$

$$SO_3^{2-} + SiO_2 \rightarrow SiO_3^{2-} + SO_2$$

Gas evolution is accentuated by the fact that as the glass passes from one oxidation state to another, solubility of the gases present in the glass passes through a minimum. That is, the $SO_2$ formed as a result of the sulphide/sulphate interaction is unable to dissolve in the glassy matrix and, hence, must be released in the form of gas bubbles which rise to the glass surface. (See Manring, W. H., Billings D. B., Conroy A. R., Bauer, W. C. "Reduced sulphur compounds" Glass Ind. July 1967, p 374).

As glass manufacturers are often committed to numerous colour changes each year, and many such changes involve a change in oxidation state of the melt, the loss of productivity caused by foaming during colour changes can be quite large.

It is an object of the present invention to provide a method of reducing foam formation in glass furnaces which occurs during colour changes involving changes of the oxidation state of the glass melt.

It is a further object of the present invention to provide a method of changing colour between glass melts of different oxidation state which results in less loss of saleable glass production than the conventional run-out/flush/fill-on procedure.

Applicants have found that foaming during such colour changes can be reduced by adjusting the oxidation state of the melt in the furnace (e.g., by varying the composition of the batch being added to said melt) such that the difference in the oxidation state of the melt in the furnace and that of the incoming second melt or batch of the new colour, is reduced. This results in a decrease in interchemical reaction between the second colour and first colour melts thereby reducing formation of gaseous sulphur dioxide. In particular, applicants have found that such an adjustment is suitable for use in colour change methods involving a run-out/fill-on technique or a transition technique.

In the run-out/fill-on type of colour change, the need for a flush step can often be eliminated due to the reduction in foam formation.

Alternatively, in what is known as a transition colour change, the composition, colour and oxidation state of the melt in the furnace can be adjusted to the required levels for the differently coloured incoming melt without having to substantially alter the level of melt in the furnace at any given time. Hence in the transition change, it is possible to continuously change the oxidation state of the glass melt in the furnace by adjusting the constituents of the incoming batch which affect oxidation state. When the oxidation state of the melt in the furnace has been adjusted as closely as possible to that of the required new melt, addition of colouring ingredients for the new melt may then be commenced. The actual composition of the first or outgoing melt only taking into account the major constituents of the said melt (i.e., excluding the small amounts of constituents which affect colour and oxidation state) should also be altered to correspond to that of the second or incoming melt at any stage during the changeover by appropriate adjustment of the major constituents in the incoming batch. At the same time as batch comes in, glass melt is withdrawn from the furnace to be formed into finished glassware. Hence, the level of the glass melt in the furnace remains substantially constant while its composition, colour and oxidation state are being altered by the addition of batch.

Accordingly the present invention provides a method of reducing foam formation which occurs in a furnace during changeover from a first to a second glass melt of different oxidation state and colour which comprises adjusting, by a series of steps the oxidation state of the first melt towards that of the second melt prior to introducing or removing colourants in order to produce the colour of the second melt.

The maximum rate at which the oxidation state of the first melt is adjusted will be governed by the residence time distribution in a particular furnace, i.e., the effect of capacity and physical dimensions of a furnace will affect the rate of batch additions because a batch will usually appear in the furnace output at any time between 8 and 48 hours depending on the furnace and the rate at which glass is being drawn. Discussions of these factors can be found in most chemical engineering texts - e.g., Chemical Reaction Engineering by Octave Levenspiel - Second Printing. Hence it is felt that the maximum rate of additions possible for varying oxidation state can be readily determined by the person skilled in the art by calculation and experiment and requires no further explanation in this specification.

For the purposes of the invention glass oxidation state is defined in terms of an empirical factor known as the Manring Carbon Number (Glass Ind. 39, (3), 139, 1958). The "Carbon Number" technique assumes that all reducing and oxidising agents can be given a number which equates their reducing or oxidising power to a certain number of ounces of carbon. In this way the effect of these materials in a batch can be added or subtracted so as to give the resultant levels of oxidation or reduction of the total batch of glass. Thus, glasses with negative carbon number are considered to be reduced while those with a positive carbon number are considered to be oxidised.

Hence the oxidation state of a first melt may be adjusted towards that of a second melt by varying the concentration of the oxidising and/or reducing agents in the incoming batch fed to the melt thereby to adjust the concentration of the agents in the melt. Examples of suitable oxidising agents are dichromates, arsenic, sodium sulphate, gypsum, barytes and nitre and preferred reducing agents include slag, aluminium powder, cyanides, carbon, sulphur, calcium sulphide, ferrous sulphide, iron pyrites and iron chromite. However, any other conventional oxidising or reducing agents compatible with the glass melt may also be suitable.

To minimise foam formation in a transition type change it is preferred that the oxidation state of the first melt be adjusted as closely as possible to that of the second melt without causing colour instability of the melt. However, such careful adjustment is generally not necessary for a run-out/fill-on type of change.

A glass melt is defined as having colour instability when small changes of glass oxidation state of the melt give large changes in colour of the melt. For example the transmission of the melt for a major absorption band may change by at least 10 percent with a change of about 10 units in the carbon number of the melt.

The method of the invention helps to reduce the amount of foam produced during the changeover thereby permitting a more rapid colour change. However, some foam formation will amost inevitably occur even though the actual amount of foaming is reduced. Spraying the foam with oil using conventional techniques will further reduce the remaining foam if this is necessary. Such a technique is described in U.S. Pat. No. 3,350,185 to Owens Illinois Inc.

Using applicants method it is often possible to eliminate the need for a "flush" step if a run-out/fill-on type of colour change is carried out. The time and materials saved by eliminating the flush step makes applicants invention less costly than the conventional run-out/flush/fill-on techniques.

However, in some instances, the use of a run-out/fill-on technique is not possible because of the unacceptable strain this may place on an aged glass furnace. Alternatively it may not be possible to carry out such changes due to the lack of a reliable water supply or because of the physical limitations imposed by furnace construction.

Using the applicant's method it is often possible in such cases to effect a transition colour change which avoids the run-out/fill-on steps completely thereby reducing or eliminating the strain on the glass furnace.

Generally speaking, applicants have found when using their method that foam is reduced by at least 30 percent and often by more than 50 percent in comparison with similar colour change methods operated over the same length of time.

The following Examples illustrate preferred embodiments of the invention:

EXAMPLE 1

Transition from a reduced to an oxidised glass

The oxidation state and composition of a reduced amber glass melt were altered slowly by adjusting the major ingredients of the incoming batch until the melt composition corresponded to that of the proposed new melt. At the same time the amount of carbon in the incoming batch was reduced to make the amber glass melt more oxidised. The carbon numbers of the batch added to the melt at different stages of the changeover are summarised in Table A. Carbon "removal" was continued until a limiting amber composition was reached, that is until the glass colour started to become unstable. At this point the iron level in the incoming batch was increased sufficiently to maintain the amber colour. Once the limiting amber colour was reached the colour change was accomplished by filling on with oxidised glass batch and colourant without excessive foam formation. The foam was reduced at this stage by an oil spray applied to it. This method was used and found to be successful for amber glass to U.V. green glass transitions and also for amber glass to flint glass transitions. However, it was found that foam formation was less for amber glass to U.V. green glass transitions than for amber glass to flint glass transitions because of the strongly oxidising nature of the high colourant batch used in the amber glass to U.V. green glass change.

TABLE A

Amber glass to U.V. green glass transition

| Carbon Number | |
|---|---|
| −120 | At the beginning of the changeover |
| − 65 | When addition of colourant commenced |
| + 19 | When the changeover was complete |

Amber glass to flint glass transition

| Carbon Number | |
|---|---|
| −120 | At the beginning of the changeover |
| − 65 | When addition of colourant commenced |
| + 8 | When the changeover was complete |

EXAMPLE 2

Transition from an oxidised to a reduced glass

Applicants have found that such changes must normally be carried out slowly to avoid foaming problems. The present Example deals with a flint glass to amber glass transition.

A flint glass melt was gradually reduced as much as possible by reducing or eliminating the amounts of the oxidants, arsenic oxide and sodium nitrate, from the incoming batch. The carbon numbers of the batch added to the melt at different stages of the changeover are summarised in Table B. The reducing agent carbon was also added to the batch to further reduce the glass melt. Thereafter sufficient iron oxide was added to develop an amber colour. In this way it was possible to pass slowly through the "foaming region" whilst minimising the production of off-colour ware. Development of the amber colour took approximately 96 hours from the start of the change. However, only 36 to 48 hours of the ware produced was considered "off colour" and all but 10 hours of production was saleable. By reducing the white glass as far as possible before adding the iron oxide required to develop an amber colour the production of off-colour ware was minimised. During the colour change some foam was produced in the tank. However, the foam level never exceeded two inches and therefore it was of no real consequence despite the fact that it did cause a slight drop in bottom temperatures.

TABLE B

| Carbon Number | |
|---|---|
| + 8 | At the beginning of the changeover |
| − 25 | When addition of colourant commenced |
| −120 | When the changeover was complete |

EXAMPLE 3

Run-out colour change of production of a reduced glass (amber glass) after an oxidised glass (flint glass)

As mentioned previously, the traditional run-out/flush/fill-on colour changes can take anything from 80 to 96 hours to complete. The present Example deals with a run-out flint glass to amber glass change which can be completed within 24 hours. Part of the reason for the speed of the change is that a flush out step is not required.

To minimise the amount of foam formed when amber cullet was batched into the flint glass remaining in the tank, the flint glass was reduced prior to the colour change. Thus, the oxidants, arsenic oxide and sodium nitrate, were removed from the flint glass by reduction of the amounts of these oxidants in the incoming batch, 24 hours before changeover. The reduced flint glass was then rapidly drained from the tank with the furnace being kept as hot as possible to ensure easy flow of the melt. Once tapped, the flint glass was runout at an average of 25 tons/hr., the actual run-out phase of the operation taking approximately 6 and a ½ hours. At the end of the run-out approximately 4 inches of flint glass remained in the tank. Amber cullet fill-on was then commenced at 6 tons per hour, cullet guns being used to distribute the cullet over the tank evenly. An oil spray and a pre-reducing of the flint glass was effective in reducing the amount of foam formed during fill-on. After 2 hours fill-on rate was increased to 8 tons per hour and finally to 10 tons per hour. With the glass level 5 and a ½ inches down, amber batch fill-on was commenced. Batch was added at an average rate of 6 and a ½ tons per hour. This brought the tank on level 23 and a ½ hours after tapping. The first 20 batches (eleven used in fill-on) contained extra soda ash and 10 percent extra pyrites and coke to assist in colour development. Colour was acceptable 6 hours after the fill-on had been completed. The carbon numbers of the batch added to the furnace at different stages of the changeover are summarised in Table C.

TABLE C

| Carbon Number | |
|---|---|
| + 8 | At the beginning of the changeover |
| − 5 | Immediately prior to run-out |
| − 120 | Fill-on |

EXAMPLE 4

Transition change from amber glass to white glass

This Example provides a detailed description of a stepwise change from amber glass to white glass at applicant's plant at Lae, New Guinea.

The steps are summarised in Table 1 and the levels of the added ingredients determining carbon number and colour (iron oxide) for the incoming batch are given in Table 2.

TABLE 1

| STEP | CARBON NUMBER (CN) | PERIOD IN HOURS OVER WHICH THE BATCH WAS ADDED |
|---|---|---|
| 0 | −130 | — |
| 1 | − 70 | 22 |
| 2 | − 30 | 6 |
| 2A | − 10 | 7 |
| 3 | + 16 | 8 |
| 4 | + 24.5 | 24 |
| 5 | + 21.5 | — |

TABLE 2

STEP CHANGE SCHEDULE

| MATERIALS (DRY WEIGHTS IN LBS) | INITIAL | 1 | 2 | 2A | 3 | 4 |
|---|---|---|---|---|---|---|
| SALTCAKE | 9.0 | 5 | 5 | 5 | 5 | — |
| GYPSUM | — | — | — | — | — | 11 |
| SODIUM NITRATE | — | — | — | — | 7 | 7 |
| IRON OXIDE | 1.73 | 1.94 | — | — | — | — |
| COAL DUST | 5.8 | 3.5 | 2.5 | 1.25 | — | — |
| * CARBON NUMBER | −130 | −70 | −30 | −10 | +16 | +24.5 |
| BATCH TIME (HOURS) | — | 22 | 6 | 7 | 8 | 24 |

*NOTE: C.N. of Amber cullet assumed to be −130 : C.N. of white cullet assumed to be +22.

Introduction of the CN −70 batch caused no foam problems at all. However, a little foam accompanied the introduction of the CN − 30 batch, but not as much as anticipated. When the batch of CN −10 was introduced into the furnace the foam level rose to about 3 inches to 4 inches, but it was not until the introduction of the CN +16 batch that any great amount of foam was formed and a maximum foam level of 7 inches was reached 51 hours after the introduction of the first transition batch. This foam did not remain long and the majority had disappeared within 12 hours. With the rapid change in carbon number, the amber colour faded, thereby minimising the production of off-colour ware.

The above change gave satisfactory control of foam generation and a relatively short total time for the transition and the glassware produced from the melt was not affected by seed or blister for the whole period of the change.

We claim:

1. A method of reducing foam formation in a furnace during a changeover from a glass melt of highly oxidized state of one colour to a reduced state of a different colour which comprises gradually, by a series of steps, changing the oxidation state by adding reducing substance to the batch until the melt is on the verge of colour instability and then introducing sufficient colourants and reducing substances to produce a stable reduced state.

2. A method according to claim 1 wherein the oxidized state of the melt is adjusted towards that of the reduced state of the melt such that a change of 10 units in the carbon number of the melt results in a change of transmission of the melt for a major absorption band of at least 10 percent, prior to introducing colourant to the batch.

3. A method of reducing foam formation in a furnace during a changeover from a glass melt of highly reduced state of one colour to an oxidized state of a different colour which comprises gradually, by a series of steps, changing the oxidation state by removing reducing substances from the batch until the melt is on the verge of colour instability and then removing colourant and sufficient reducing substances to produce a stable oxidized state.

4. A method according to claim 3 wherein the reduced state of the melt is adjusted towards that of the oxidized state of the melt such that a change of 10 units in the carbon number of the melt results in a change of transmission of the melt for a major absorption band of at least 10 percent prior to removing colourant from the batch.

* * * * *

UNITED STATES PATENT OFFICE
CERTIFICATE OF CORRECTION

PATENT NO. : 3,869,270

DATED : March 4, 1975

INVENTOR(S) : Michael Brungs & John Burniston

It is certified that error appears in the above—identified patent and that said Letters Patent are hereby corrected as shown below:

Foreign Application Priority Data

June 16, 1972 Australia . . . . . PA9354 (now 56961/72)
    July 6, 1973 Australia . . . . . 57828/73

Signed and Sealed this ninth Day of September 1975

[SEAL]

Attest:

RUTH C. MASON
*Attesting Officer*

C. MARSHALL DANN
*Commissioner of Patents and Trademarks*